United States Patent
Ziminsky (10) Patent No.: US 11,940,354 B2
(45) Date of Patent: Mar. 26, 2024

(54) SYSTEMS AND METHODS FOR DETECTING A FUEL LEAK

(71) Applicant: General Electric Company, Schenectady, NY (US)

(72) Inventor: Willy Steve Ziminsky, Simpsonville, SC (US)

(73) Assignee: GE Infrastructure Technology LLC, Greenville, SC (US)

(*) Notice: Subject to any disclaimer, the term of this patent is extended or adjusted under 35 U.S.C. 154(b) by 449 days.

(21) Appl. No.: 17/006,107

(22) Filed: Aug. 28, 2020

(65) Prior Publication Data

US 2022/0065736 A1   Mar. 3, 2022

(51) Int. Cl.
| | |
|---|---|
| *G01M 3/40* | (2006.01) |
| *F01D 11/00* | (2006.01) |
| *F02C 9/46* | (2006.01) |
| *G01N 27/04* | (2006.01) |

(52) U.S. Cl.
CPC .............. *G01M 3/40* (2013.01); *F01D 11/00* (2013.01); *F02C 9/46* (2013.01); *G01N 27/04* (2013.01)

(58) Field of Classification Search
CPC .......... G01M 3/40; F01D 11/00; F01D 21/10; F02C 9/46; F02C 7/222; G01N 27/04; F23R 2900/00019; F23R 3/283; Y02T 50/60; F05D 2240/35; F05D 2260/607; F05D 2260/80; F05D 2260/81
See application file for complete search history.

(56) References Cited

U.S. PATENT DOCUMENTS

| | | | | |
|---|---|---|---|---|
| 3,665,787 A | * | 5/1972 | Wilkinson | F02B 33/34 123/561 |
| 8,928,338 B2 | * | 1/2015 | Nelson | F02D 41/1466 324/464 |
| 2010/0107737 A1 | * | 5/2010 | Krafthefer | B01D 46/442 96/417 |
| 2015/0068209 A1 | * | 3/2015 | Agrawal | G01K 3/06 60/726 |
| 2016/0207639 A1 | * | 7/2016 | Ellis | B64F 5/60 |
| 2017/0241936 A1 | * | 8/2017 | Chang | G01N 33/0075 |
| 2018/0156457 A1 | * | 6/2018 | Cioncolini | F23R 3/286 |
| 2018/0363906 A1 | * | 12/2018 | Bailey | F23R 3/04 |

FOREIGN PATENT DOCUMENTS

| | | | | | |
|---|---|---|---|---|---|
| CN | 203052744 U | * | 7/2013 | ............... | F24C 3/12 |
| JP | H0712757 U | * | 3/1995 | ............... | F23R 3/00 |
| KR | 20170002469 U | * | 7/2017 | ............... | G01M 3/26 |

* cited by examiner

*Primary Examiner* — Alexander Satanovsky
*Assistant Examiner* — Asm Fakhruddin
(74) *Attorney, Agent, or Firm* — Dority & Manning, P.A.

(57) ABSTRACT

Systems and methods of detecting a fuel leak are provided. A method of detecting a fuel leak within a turbomachine combustor includes a step of monitoring, by a controller, a sensor output from a particulate matter sensor positioned on a component within the combustor. The sensor output includes one of a fault state sensor output or a non-fault state sensor output. The method further includes receiving, with the controller, the fault state sensor output from the particulate matter sensor when a fuel leak is present within the combustor.

14 Claims, 6 Drawing Sheets

SYSTEMS AND METHODS FOR DETECTING A FUEL LEAK

FIELD

The present disclosure relates generally to systems and methods for detecting a fuel leak. Specifically, the present disclosure relates to systems and methods for detecting a fuel leak within a turbomachine combustor.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Gas turbines typically include multiple fuel carrying components, such as multiple fuel nozzles, liquid fuel injectors, and various other tubing and/or conduits in the combustor section. Each of these components can be multi-part complex assemblies having multiple seals and multiple welds. Additionally, during operation of the gas turbine, each of the components in the combustor section may be exposed to various forces and stresses, e.g., vibrational forces and thermal stresses, which can cause failure of the seals and/or cracks in the welds. These failures and/or cracks may result in potential fuel leaks within the combustor section, which reduces the overall operating efficiency of the gas turbine and can cause significant hardware damage.

Accordingly, a system and method for fuel leak detection is desired in the art.

BRIEF DESCRIPTION

Aspects and advantages of the systems and methods in accordance with the present disclosure will be set forth in part in the following description, or may be obvious from the description, or may be learned through practice of the technology.

In accordance with one embodiment, a method of detecting a fuel leak within a combustor of a turbomachine is provided. The method includes a step of monitoring, by a controller, a sensor output from a particulate matter sensor positioned on a component within the combustor. The sensor output includes one of a fault state sensor output or a non-fault state sensor output. The method further includes receiving, with the controller, the fault state sensor output from the particulate matter sensor when a fuel leak is present within the combustor.

In accordance with another embodiment, a system for detecting a fuel leak is provided. The system includes a gas turbine having an inlet section, a compressor, at least one combustor, and a turbine section. The system further includes a particulate matter sensor positioned on a component within the at least one combustor. The particulate matter sensor is configured to communicate a sensor output to a controller. The controller includes a computing device in electronic communication with the particulate matter sensor. The computing device is configured to monitor the sensor output from the particulate matter sensor. The sensor output includes one of a fault state sensor output or a non-fault state sensor output. The computing device is further configured to receive the fault state sensor output from the particulate matter sensor when a fuel leak is present within the combustor.

These and other features, aspects and advantages of the present systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems and methods, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
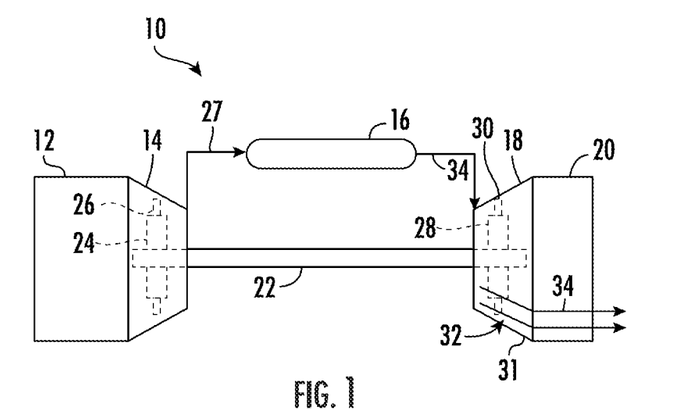
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the fuel nozzles as described herein may be used in any type of turbomachine including, but not limited to, a steam turbine, an aircraft gas turbine, or a marine gas turbine.

Figure 2:
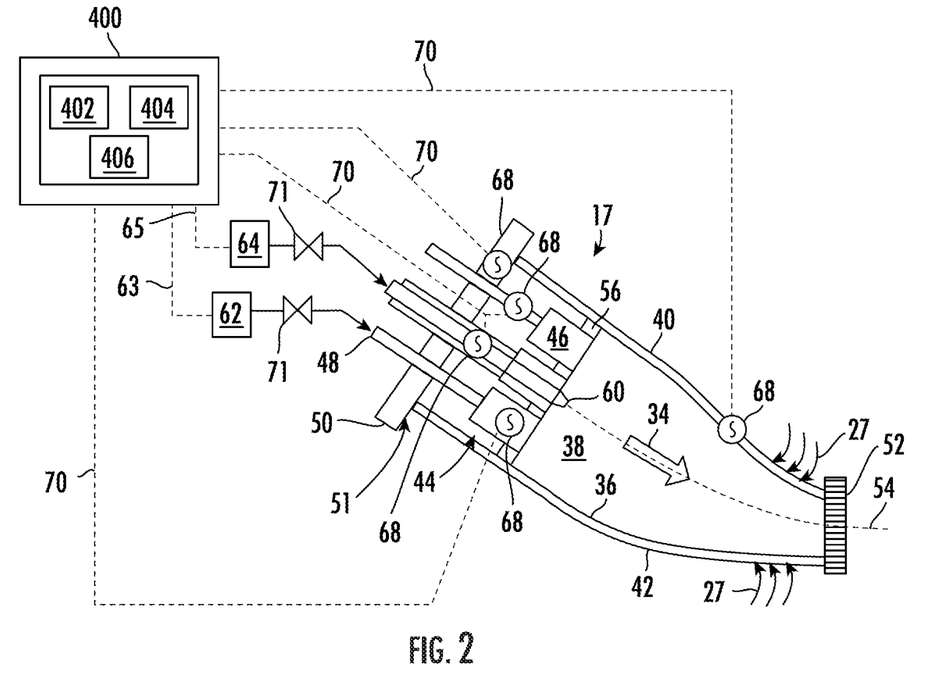
FIG. 2 illustrates a cross-sectional view of a combustor in accordance with embodiments of the present disclosure.

As shown, the gas turbine 10 generally includes an inlet section 12, a compressor section 14 disposed downstream of the inlet section 12, a plurality of combustors 17 (one of which is shown in FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing compressed air 27 to the combustors of the combustor section 16. The compressed air 27 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown in FIG. 2, the combustor 17 includes a liner 36 that contains and conveys combustion gases 34 to the turbine. The liner 36 may define a combustion chamber 38 within which combustion occurs. The liner 36 may have a cylindrical liner portion and a tapered transition portion that is separate from the cylindrical liner portion, as in many conventional combustion systems. Alternately, the liner 36 may have a unified body (or "unibody") construction, in which the cylindrical portion and the tapered portion are integrated with one another. Thus, any discussion herein of the liner 36 is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 36 is surrounded by an outer sleeve 40, which is spaced radially outward of the liner 36 to define an annulus 42 between the liner 36 and the outer sleeve 40. The outer sleeve 40 may include a flow sleeve portion at the forward end and an impingement sleeve portion at the aft end, as in many conventional combustion systems. Alternately, the outer sleeve 40 may have a unified body (or "unisleeve") construction, in which the flow sleeve portion and the impingement sleeve portion are integrated with one another in the axial direction. As before, any discussion herein of the outer sleeve 40 is intended to encompass both conventional combustion systems having a separate flow sleeve and impingement sleeve and combustion systems having a unisleeve outer sleeve.

A head end portion 44 of the combustor 17 includes one or more fuel nozzles 322. The fuel nozzles 322 have a fuel inlet 48 at an upstream (or inlet) end. The fuel inlets 48 may be formed through an end cover 50 at a forward end of the combustor 17. The downstream (or outlet) ends of the fuel nozzles 322 extend into and/or through a combustor cap 56.

In many embodiments, the head end portion 44 of the combustor 17 may be at least partially surrounded by a forward casing, which is physically coupled and fluidly connected to a compressor discharge case. In various embodiments, the compressor discharge case may be fluidly connected to an outlet of the compressor 14 and define a pressurized air plenum that surrounds at least a portion of the combustor 17. Compressed air 27 may flow from the compressor discharge case into the annulus 42 at an aft end of the combustor 17, via openings defined in the outer sleeve 40. Because the annulus 42 is fluidly coupled to the head end portion 44, the compressed air 27 travels upstream from the aft end of the combustor 17 to the head end portion 44, where the compressed air 27 reverses direction and enters the fuel nozzles 322. For example, the compressed air 27 may travel through the annulus 42 in the opposite direction of the combustion gases 34 within the liner 36.

Each fuel nozzle 322 may be in fluid communication with a fuel supply 62, which may contain either a gaseous fuel, a liquid fuel, or mixtures thereof. Fuel and compressed air 27 are introduced by the fuel nozzles 322 into a combustion chamber 38 at a forward end of the liner 36, where the fuel 28 and air 27 are ignited and combusted to form the combustion gases 34. In one embodiment, the fuel 28 and air 27 are mixed within the fuel nozzles 322 (e.g., in a premixed fuel nozzle). In other embodiments, the fuel 28 and air 27 may be separately introduced into the combustion chamber 38 and mixed within the combustion chamber 38 (e.g., as may occur with a diffusion nozzle). Reference made herein to a "fuel/air mixture" should be interpreted as describing both a premixed fuel/air mixture and a diffusion-type fuel/air mixture, either of which may be produced by the fuel nozzles 322.

One or more liquid fuel cartridges 60 may be disposed within the combustor 17 and may be in fluid communication with a liquid fuel supply 64. The liquid fuel cartridge 60 may convey liquid fuel through the head end of the combustor 17 to the combustion chamber 38. In an exemplary embodiment, the liquid fuel cartridge 60 is installed along an axial centerline 54 of the combustor 17 and is disposed co-axially within one of the fuel nozzles 322. In many embodiments, the liquid fuel cartridge 60 may extend co-axially with both the combustor 17 and a fuel nozzle 322.

The combustion gases 34, which are produced by combusting gaseous fuel and/or liquid fuel with compressed air 27, travel downstream toward an aft frame 52 of the combustor 17, the aft frame 52 representing an aft end of the combustor 17. In many embodiments, the aft frame 52 may be connected to the turbine 18, such that the combustion gases 34 may exit the combustor section 16 at the aft frame 52 and enter the turbine 18.

A control system, or controller, 400 may be in communication with the combustor 17 and may be used to control the fuel provided to the combustor 17. The control system 400 as is described herein may include one or more processors or processing units, system memory, and some form of computer-readable media. In various embodiments, an example of which is illustrated in FIG. 1, the control system 100 includes a computing system or device 402 (FIG. 2) having at least one processor 404 that executes programs and operations to control the operation of the combustor 17 using sensor inputs, scheduling algorithms, control models and/or instructions from human operators and a memory 406. The control system 400 may be in communication with the fuel supplies 62, 64, via a signal 63, 65. In many embodiments, the control system 400 may be operable to control the flow of fuel through both the fuel nozzles 322 and the liquid fuel cartridge 60 by operating one or more valves 71.

One or more particle matter sensors or "soot sensors" 68 (labeled "S" in FIG. 2 to represent a sensor) may be used to detect the presence of a fuel leak within the combustor 17. Fuel leaks may occur within the combustor due to the vibrational and thermal stresses experienced by the various combustor components during operation of the gas turbine 10. For example, welds in the combustor components may crack due and seals may fail due to stresses experienced during operation over time, which can result in fuel leaking within the combustor 17. When fuel leaks within the combustor, it produces soot, which is a black powdery flaky substance that includes amorphous carbon. Soot may be produced by the incomplete burning of liquid and/or gaseous fuel, e.g., hydrocarbon containing liquid and/or gaseous fuel, within the combustor 17. The particulate matter sensors 68 described herein may be operable to sense the presence of soot within the combustor and communicate via a sensor output 70 to the control system 400.

As shown in FIG. 2, the particulate matter sensors 68 may be positioned in various locations within the combustor 17. In exemplary embodiments, the particulate matter sensors 68 may be positioned upstream from the combustion chamber 38 and/or the combustor cap 56. For example, the particulate matter sensor 68 may be disposed on the end cover 50, e.g., on the interior surface 51 of the end cover 50. In other embodiments, one or more particulate matter sensors 68 may be positioned in one or more locations on each of the fuel nozzles 322. In particular embodiments, one or more particulate matter sensors 68 may be positioned in one or more locations on the liquid fuel cartridge 68. In some embodiments, a particulate matter sensor 68 may be positioned on either the outer sleeve 40 or the combustion liner 36, such that it is disposed within the annulus 42.

In this way, each of the particulate matter sensors 68 may be positioned on one or more of the components within the combustor 17 over which compressed air 27 flows. As a result, when a fuel leak is present within the combustor 17, soot may be carried through the compressed air stream and accumulate on one or more of the particulate matter sensors 68, which will then be communicated to the control system 400 indicating the presence of said fuel leak.

Figure 3:
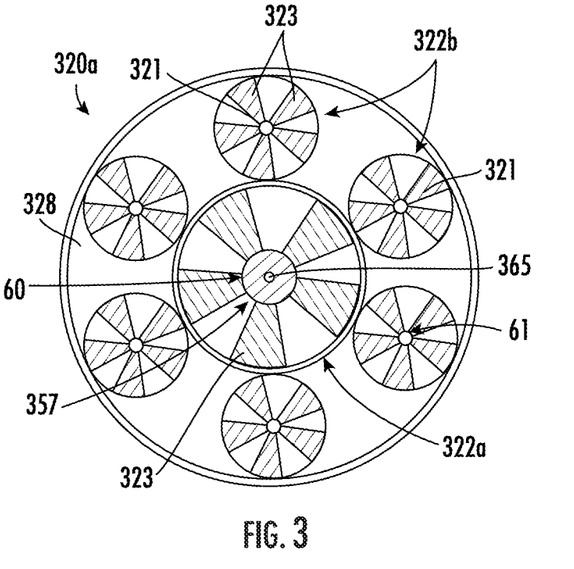
FIG. 3 illustrates a plan view of a combustor head end in accordance with embodiments of the present disclosure.

FIG. 3 is a plan view of a first embodiment of a combustor head end 320a, in which the liquid fuel cartridge 60 is installed. As shown, the liquid fuel cartridge 60 may be a primary liquid fuel cartridge 357 that is installed within a central fuel nozzle 322a, such as a swirling fuel nozzle, swozzle, or other suitable fuel nozzle. The central fuel nozzle 322a is surrounded by a plurality of outer fuel nozzles 322b, which may also be swirling fuel nozzles, swozzles, or other suitable fuel nozzles. As shown, one or more secondary liquid fuel cartridges 61, which may have a similar configuration to the liquid fuel cartridge 60, may be disposed within one or more of the outer fuel nozzles 322b.

Each fuel nozzle 322a, 322b may include swirling vanes 323 that impart a swirling direction to air flowing therethrough. In some embodiments, the swirling vanes 323 of the outer fuel nozzles 322b are disposed about a central hub 321. In other embodiments, as shown, the swirling vanes 323 may be disposed about the secondary liquid fuel cartridge 61. In exemplary embodiments, each of the outer fuel nozzles 322b may include a central hub 321, such that the only liquid fuel cartridge 60 is the primary liquid fuel cartridge 61 which is disposed within the center fuel nozzle 322a. The swirling vanes 323 in the central fuel nozzle 322a may be disposed about the primary liquid fuel cartridge 61. Although six outer fuel nozzles 322b are shown, it should be understood that other numbers of fuel nozzles 322b may be employed (such as 4, 5, or 8 fuel nozzles 322b). The fuel nozzles 322a, 322b are installed within corresponding openings (not separately labeled) in the combustor cap 56.

Figure 4:
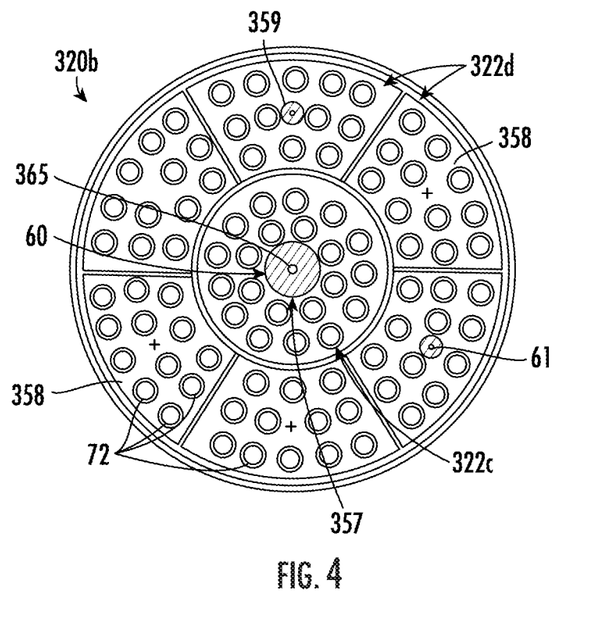
FIG. 4 illustrates a plan view of a combustor head end in accordance with embodiments of the present disclosure.

FIG. 4 is a plan view of a second embodiment of a combustor head end 320b, in which the liquid fuel cartridge 60 of FIG. 3 is installed. As shown, the liquid fuel cartridge 60 may be a primary liquid fuel cartridge 357 that is installed within a center fuel nozzle 322c, such as a bundled tube fuel nozzle. The center fuel nozzle 322c is surrounded by a plurality of fuel nozzles 322d, which may also be bundled tube fuel nozzles. As shown, one or more secondary liquid fuel cartridges 61, which may have a similar configuration to the liquid fuel cartridge 60, may be disposed within one or more of the fuel nozzles 322d. Each bundled tube fuel nozzle 322c, 322d includes a plurality of individual premixing tubes 72 within which fuel and air are mixed. The premixing tubes 72 extend through an aft plate 368, which may be unique to each bundled tube fuel nozzle 322c, 322d, or which may extend across all the bundled tube fuel nozzles 322c, 322d.

The bundled tube fuel nozzles 322c, 322d may include an upstream fuel plenum unique to each fuel nozzle 322c, 322d, and each premixing tube 72 may include one or more fuel injection ports in fluid communication with the fuel plenum. Air flowing through an inlet end of each premixing tube 72 mixes with fuel flowing through the fuel injection port(s), and a mixture of fuel and air is conveyed through an outlet end of each tube 72.

Alternately, each premixing tube 72 may include an inlet end in which a fuel lance is installed. A plurality of air inlet holes is disposed downstream of the fuel lance, such that air flowing through the air inlet holes is mixed with fuel from the fuel lance. A mixture of fuel and air is conveyed through the outlet end of each tube 72.

Although the bundled tube fuel nozzles 322d are shown as having a sector shape that includes two radially extending sides and two oppositely disposed arcuate sides, it should be understood that the bundled tube fuel nozzles 322d may have any shape or size relative to the center bundled tube fuel nozzle 322c The combustor 24 may be any type of combustor known in the art, and the present invention is not limited to any particular combustor design unless specifically recited in the claims. For example, the combustor 24 may be a can-annular or an annular combustor. FIG. 2 provides a perspective side view of a portion of an exemplary combustor 100 as may be incorporated in the gas turbine 10 shown in FIG.

Figure 5:
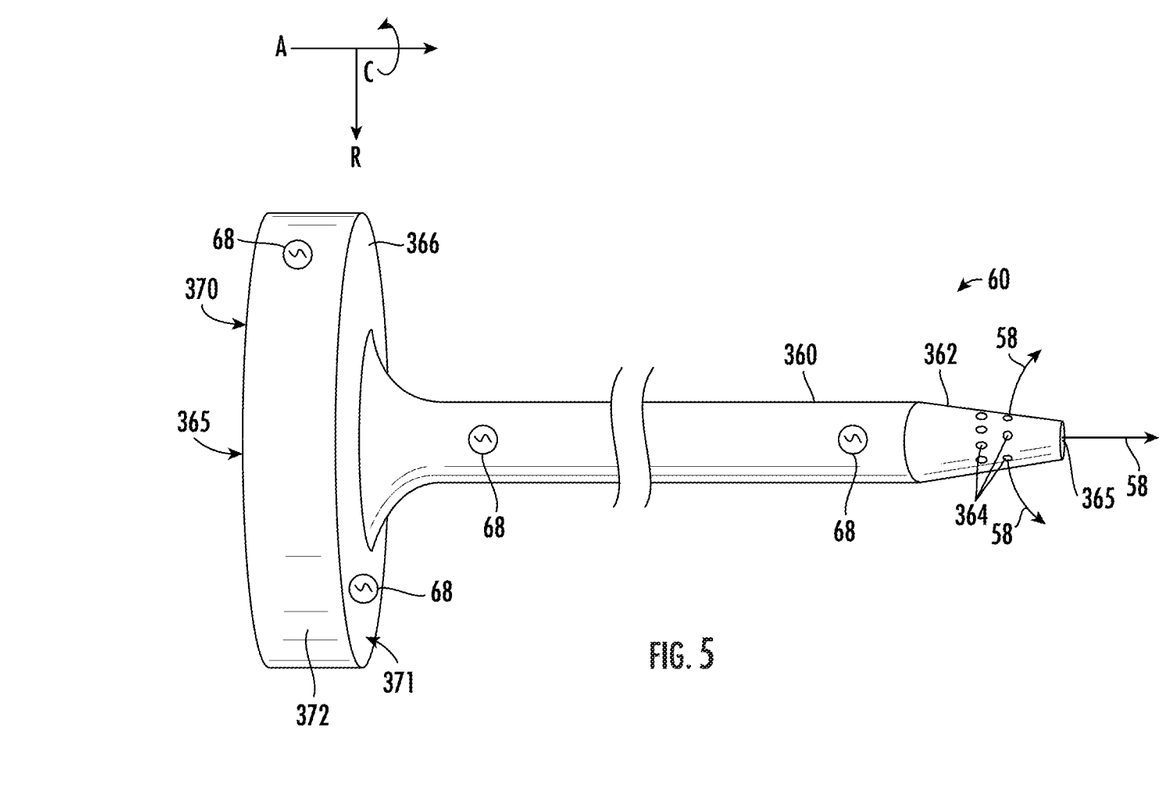
FIG. 5 illustrates a perspective view of a liquid fuel cartridge in accordance with embodiments of the present disclosure.

FIG. 5 illustrates a liquid fuel cartridge 60, as may be used with the combustor 17 of FIG. 2. The liquid fuel cartridge 60 includes a cylindrical body 360, a liquid fuel cartridge tip 362, and a mounting flange 366 that defines an inlet 364 that receives the liquid fuel 58 from the liquid fuel supply 64. In many embodiments, the mounting flange may define an upstream surface 370, a downstream surface 371, and an outer band 372 extending therebetween. The upstream surface 370 may be in contact with the end cover 50 when positioned within the combustor 17. As shown in FIG. 5, the cartridge tip 362 may diverge radially inward in the axial direction A, such that the cartridge tip 362 has a generally conical shape. The conical shape of the cartridge tip 362 may be advantageous over, e.g., a cylindrical shape such that it provides an aerodynamic contour that minimizes the potential for fuel vortices or hot spots along the cartridge tip 362. In various embodiments, as shown best in FIG. 2, the cartridge tip 362 may be disposed entirely within the combustion chamber 38. As shown in FIG. 3, the cartridge tip 362 may define liquid fuel injection holes 364 circumferentially spaced apart from one another on the cartridge tip 362.

As shown in FIG. 5, one or more particulate matter sensors 68 (labeled "S" to represent a sensor) may be disposed in various locations on the surface of the liquid fuel cartridge 60 in order to detect a fuel leak within the combustor 17 during operation of the gas turbine 10. For example, in many embodiments, one or more particulate matter sensors 68 may be positioned on the mounting flange 366. For example, one or more particulate matter sensors 68 may be positioned on the outer band 372 and/or the downstream surface 371 of the mounting flange 366. In exemplary embodiments, one or more particulate matter sensors 68 may be positioned on the surface of the cylindrical body 360 proximate the mounting flange 366, which may be advantageous due to the relatively high number of welds (potential fuel leak spots) in this region of the liquid fuel cartridge 60. In various embodiments, one or more particulate matter sensors 68 may be positioned on the surface of the cylindrical body 360 proximate the cartridge tip 362.

Figure 6:
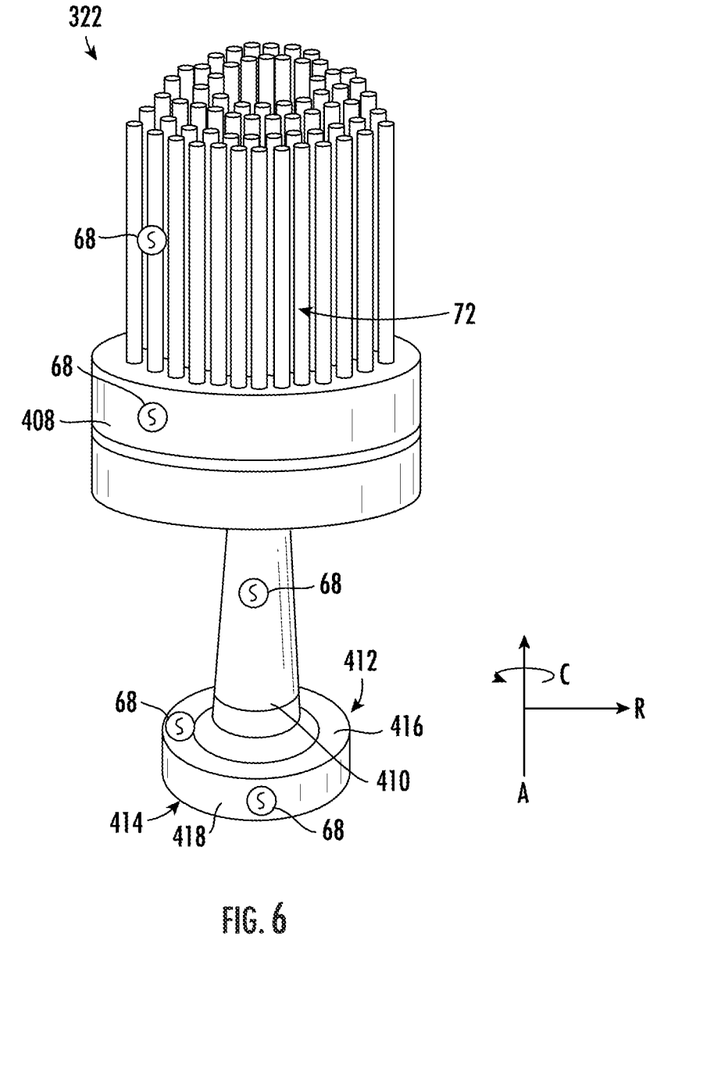
FIG. 6 illustrates a perspective view of a fuel nozzle in accordance with embodiments of the present disclosure.

FIG. 6 illustrates a fuel nozzle 322, which may be used with the combustor 17 of FIG. 2. Although the fuel nozzle 322 shown in FIG. 6 is a bundled tube fuel nozzle, the fuel nozzle 322 may be a swozzle and/or other types of fuel nozzles known in the art. As shown, the fuel nozzle 322 includes a main body or fuel plenum 408 and a plurality of premix tubes 72 which extend substantially axially through the fuel plenum 408. In particular embodiments, the fuel nozzle 322 may be connected to an end cover 50 of the combustor 17 via a flange 412. As shown, the flange 412 may include an upstream surface 414, a downstream surface 416, and an outer band 418 extending therebetween. In many embodiments, the upstream surface 414 of the flange 412 may be in contact with the end cover 50 when the fuel nozzle 322 is installed within the combustor 17. A conduit or tube 410 may extend between the flange 412 and the fuel plenum 408. In many embodiments, the conduit 410 may extend axially downstream from the end cover 50 and provides for fluid communication between the fuel plenum 408 and the fuel supply 62. In addition, the conduit 410 may provide structural support for the generally cantilevered fuel nozzle 322.

As shown in FIG. 6, one or more particulate matter sensors 68 (labeled "S" to represent a sensor) may be disposed in various locations on the surface of the fuel nozzle 323, in order to detect a fuel leak within the combustor 17 during operation of the gas turbine 10. For example, one or more particulate matter sensors 68 may be positioned on the flange 412, such as on the outer band 418 or the downstream surface 416. In other embodiments, one or more particulate matter sensors 68 may be positioned on the conduit 410. In various embodiments, one or more particulate matter sensors 68 may be disposed on the fuel plenum 408. In particular embodiments, one or more particulate matter sensors 68 may be positioned on the premix tubes 72.

Figure 7:
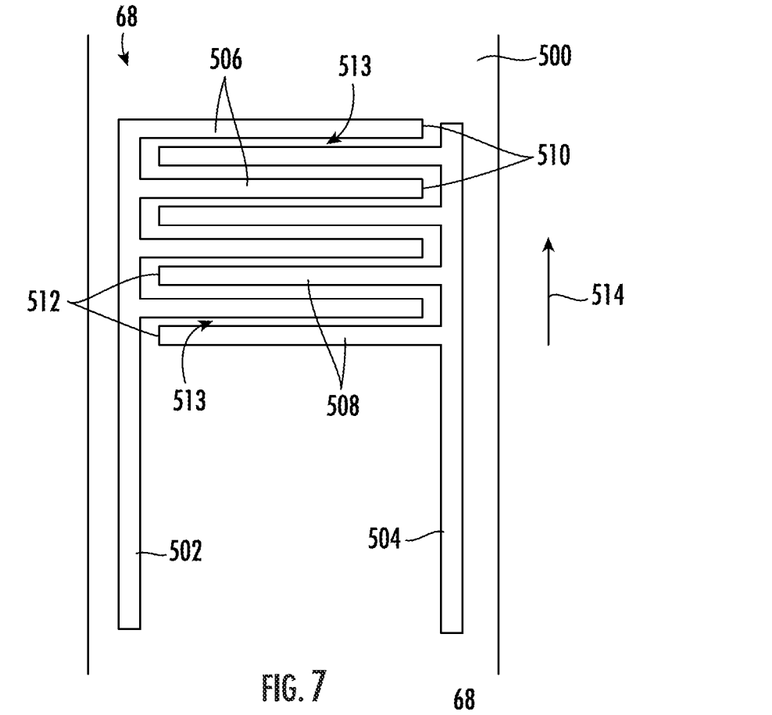
FIG. 7 illustrates a particulate matter sensor positioned on a surface and corresponding to a non-fault state sensor output in accordance with embodiments of the present disclosure.
Figure 8:
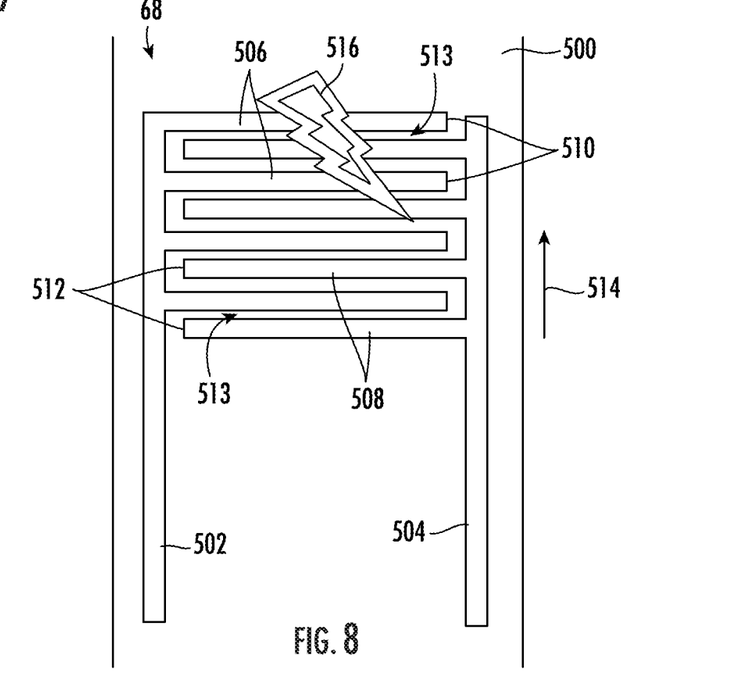
FIG. 8 illustrates a particulate matter sensor positioned on a surface and corresponding to a fault state sensor output in accordance with embodiments of the present disclosure.

FIG. 7 illustrates an exemplary embodiment of a particulate matter sensor 68 disposed on a surface 500, in accordance with embodiments of the present disclosure. The surface 500 may be any of the particulate matter sensor locations described herein, such as the surface of the cylindrical body 360, surface of the premixing tubes 78, or any other suitable surface within the combustor. As shown, the particulate matter sensor 68 may include a first electrode 502 and a second electrode 504 spaced apart from one another. In many embodiments, the electrodes 502, 504 may be in the form of a wire or wires that are operable to carry electricity. In exemplary embodiments, as shown, each electrode 502, 504 may include a plurality of branch members 506, 508 that are spaced apart and interlaced with one another. In some embodiments, the branch members 506, 508 may extend generally perpendicularly from the respective electrode 502, 504 to a respective free end 510, 512. In many embodiments, the plurality of branch members 506 of the first electrode may be interlaced with, and spaced apart from, the plurality of branch members of the second electrode 504, such that the branch members 506, 508 alternate with respect to each other in a direction 514. Gaps 513 may be defined between the branch members 506, 508 in the direction 514. In this way, no portion of the first electrode 502 is in contact with the second electrode 504. As shown in FIG. 7, the direction 514 may be generally perpendicular to the branch members 506, 508. Although each electrode 502, 504 in the particulate matter sensor 68 in FIGS. 7 and 8 is shown having four branch members 506, 508, the electrodes 502, 504 may have any number of branch members and should not be limited to a particular number unless specifically recited in the claims.

The particulate matter sensor 68 shown in FIG. 7 may correspond to a non-fault state sensor output, such that soot has not yet been deposited on the surface 500 and/or the electrodes 502, 504. In the absence of soot, as shown in FIG. 7, there is very low electrical conductivity (high electrical resistance) between the electrodes 502, 504. As soot 513 accumulates on the surface of the sensor 68, soot 516 particles act to bridge the gap 513 between the electrodes 502, 504. Because the soot 516 particles are electrically conductive the conductivity between the electrodes increases, and this change in conductivity can be communicated to the controller 400, via the sensor output 70, to indicate the presence of a fuel leak within the combustor 17.

For example, the controller 400 may be in electrical communication with the particulate matter sensor 68, such that the controller 400 is operable to measure the amount of current passing between the electrodes 502, 504. As a result, when the electrical current between the electrodes 502, 504 exceeds a predetermined threshold, the controller 400 may determine that the particulate matter sensor 68 is in a fault state, thereby detecting the presence of a fuel leak within the combustor 17.

As may be appreciated by those of skill in the art, the electrodes 502, 504 may have a maximum current that can be carried therethrough depending on the size and material of the electrodes 502, 504. As such, the controller 400 may be operable to determine the ratio of current passing between the electrodes 502, 504 and the total current that may be carried between the electrodes 502, 504 (hereinafter referred to as "the current ratio"). When the current ratio exceeds a certain predetermined threshold, it may correspond to the fault-state sensor output, thereby indicating the presence of a fuel leak within the combustor 17. For example, in some embodiments, the fault state sensor output 70 may correspond to a current ratio of between about 1% and about 100%. In other embodiments, the fault state sensor output 70 may correspond to a current ratio of between about 10% and about 100%. In various embodiments, the fault state sensor output 70 may correspond to a current ratio of between about 20% and about 100%. In particular embodiments, the fault state sensor output 70 may correspond to a current ratio of between about 40% and about 100%.

In particular embodiments, the controller 400 may be operable to measure a change in current between the electrodes 502, 504 over a period of time, which may correspond to a fault state sensor output, thereby indicating the presence of a fuel leak within the combustor 17. For example, if the current ratio jumps from about 0% to about 15% in a period of about 5 seconds, this may be detected by the controller 400 and may indicate that a fuel leak is present.

For example, as discussed above, soot 516 is created by fuel that escapes from one or more fuel leaks within the combustor, and the fault state occurs when the soot 516 is deposited on the particulate matter sensor 68 such that the soot 516 bridges the gap(s) 513 between the first electrode 504 and the second electrode 506. For example, FIG. 8 illustrates particulate matter sensor 68 that corresponds to a fault state sensor output 70, such that soot 516 has been deposited on the surface 500 and bridges the gap 513 between the plurality of electrode branches 506, 508 of the electrodes 502, 504. This fault state sensor output 70 may be communicated to the controller 400 indicating the presence of a fuel leak within the combustor 17.

Figure 9:
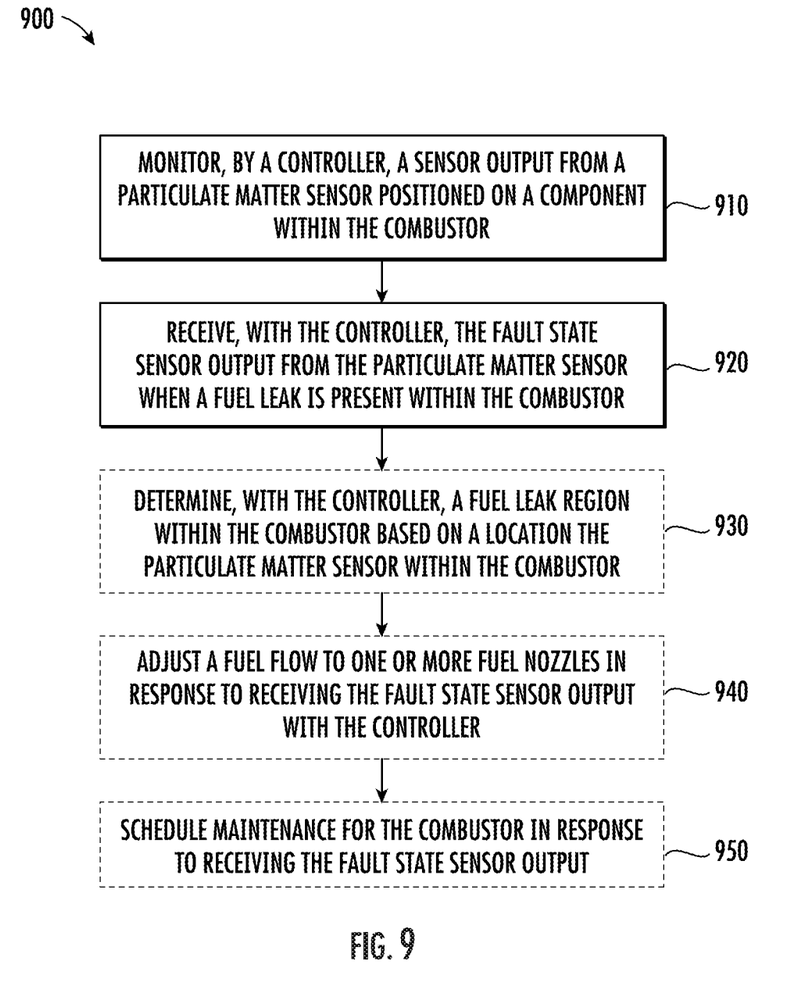
FIG. 9 illustrates a flow chart of a method for detecting a fuel leak within a turbomachine combustor in accordance with embodiments of the present disclosure.

FIG. 9 a flow chart of a sequential set of steps 910 through 950, which define a method 900 of detecting a fuel leak within a combustor 17 of a gas turbine 10, according to an embodiment of the present disclosure. As shown in FIG. 9, the method 900 may include a step 910 of monitoring, by a controller 400, a sensor output 70 from a particulate matter sensor 68 positioned on a component within the combustor 17. In many embodiments, the sensor output 70 may include one of a fault state sensor output 70 or a non-fault state sensor output 70. The fault state occurs when the soot 516 is deposited on the particulate matter sensor 68 (FIG. 8) such that the soot 516 bridges the gap 513 between the first electrode 502 and the second electrode 504. The method may further include a step 920 of receiving, with the controller 400, the fault state sensor output 70 from the particulate matter sensor 68 when a fuel leak is present within the combustor 17.

In various embodiments, the particulate matter sensor 68 may be a first particulate matter sensor 68 in a plurality of particulate matter sensors 68 arranged within the combustor 17 forward of the combustion chamber 38. For example, one or more particulate matter sensors 68 may be positioned on the liquid fuel cartridge 60 and/or on the fuel nozzles 46.

As shown in FIG. 9, the method 900 may include an optional step 930 (indicated by dashed box) of determining with the controller 400, a fuel leak region within the combustor 17 based on a location the first particulate matter sensor 68 within the combustor 17. For example, if the controller 400 receives a fault state sensor output from a particulate matter sensor 68 positioned on or proximate the mounting flange 366 of the liquid fuel cartridge 60, then the controller 400 may determine a corresponding fuel leak region within the combustor 17, e.g., the seal between the liquid fuel cartridge 60 and the end cover 50 and/or other potential fuel leak locations near the mounting flange 366.

In some embodiments, the method 900 may include an optional step 940 of adjusting a fuel flow to one or more fuel nozzles 46 in response to receiving the fault state sensor output 70. For example, once a fuel leak has been detected within the combustor, it may be desirable to reduce and/or stop the flow of fuel to the fuel nozzles 46, in order to prevent damage to the combustor 17. This may be done by adjusting one or more valves 71 (FIG. 2) with the controller 400.

In various embodiments, the method 900 may further include an optional step 950 of scheduling maintenance for the combustor 17 in response to receiving the fault state sensor output 70. For example, once the fuel leak is detected by the particle matter sensor 68 within the combustor 17, a shut down of the gas turbine 10 may be scheduled in order to remove the combustor(s) and repair the detected fuel leaks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of detecting a fuel leak within a combustor of a turbomachine, the combustor comprising a combustion liner defining a combustion chamber within which combustion occurs, the combustor further comprising a liquid fuel cartridge and a plurality of fuel nozzles, the method comprising:
   monitoring, by a controller, a sensor output from a particulate matter sensor positioned on at least one of the liquid fuel cartridge or a fuel nozzle of the plurality of fuel nozzles forward of the combustion chamber, the sensor output comprising one of a fault state sensor output or a non-fault state sensor output;
   receiving, with the controller, the fault state sensor output from the particulate matter sensor when a fuel leak is present within the combustor, wherein the fault state sensor output corresponds with a current ratio of the particulate matter sensor of between about 10% and about 100%.

2. The method as in claim 1, wherein the combustor comprises an end cover defining a forward end of the combustor, the liquid fuel cartridge positioned along an axial centerline of the combustor and coupled to the end cover, the plurality of fuel nozzles surrounding the liquid fuel cartridge, each fuel nozzle having a flange, a conduit, and a main body, wherein the flange is coupled to the end cover and the conduit extends between the flange and the main body, wherein the combustion chamber is defined within the combustion liner aft of the plurality of fuel nozzles.

3. The method as in claim 1, further comprising determining, with the controller, a fuel leak region within the combustor based on a location of the first particulate matter sensor within the combustor.

4. The method as in claim 1, wherein the particulate matter sensor comprises a first electrode spaced apart from a second electrode.

5. The method as in claim 4, wherein the fault state occurs when soot from incomplete burning of hydrocarbon fuel is deposited on the particulate matter sensor such that the soot bridges the gap between the first electrode and the second electrode.

6. The method as in claim 1, further comprising reducing a fuel flow to one or more fuel nozzles in response to receiving the fault state sensor output with the controller.

7. The method as in claim 1, further comprising scheduling maintenance for the combustor in response to receiving the fault state sensor output.

8. A system for detecting a fuel leak, the system comprising:
   a gas turbine including an inlet section, a compressor, at least one combustor having a combustion liner that defines a combustion chamber in which combustion occurs, and a turbine section, wherein the combustor further includes a liquid fuel cartridge and a plurality of fuel nozzles; and
   a particulate matter sensor positioned on at least one of the liquid fuel cartridge or a fuel nozzle of the plurality of fuel nozzles forward of the combustion chamber, the particulate matter sensor being configured to communicate a sensor output to a controller, the controller including a computing device in electronic communication with the particulate matter sensor, wherein the computing device is configured to:
      monitor the sensor output from the particulate matter sensor, the sensor output comprising one of a fault state sensor output or a non-fault state sensor output; and
      receive the fault state sensor output from the particulate matter sensor when a fuel leak is present within the combustor, wherein the fault state sensor output corresponds with a current ratio of the particulate matter sensor of between about 10% and about 100%.

9. The system as in claim 8, wherein the combustor comprises an end cover defining a forward end of the combustor, the liquid fuel cartridge positioned along an axial centerline of the combustor and coupled to the end cover, the plurality of fuel nozzles surrounding the liquid fuel cartridge, each fuel nozzle having a flange, a conduit, and a main body, wherein the flange is coupled to the end cover and the conduit extends between the flange and the main body, wherein the combustion chamber is defined within the combustion liner aft of the plurality of fuel nozzles.

10. The system as in claim 8, wherein the computing device is further configured to determine a fuel leak region within the combustor based on a location of the first particulate matter sensor within the combustor.

11. The system as in claim 9, wherein the particulate matter sensor is positioned on the liquid fuel cartridge forward of the combustion chamber.

12. The system as in claim 9, wherein the particulate matter sensor is positioned on at least one fuel nozzle of the plurality of fuel nozzles forward of the combustion chamber.

13. The system as in claim 8, wherein the particulate matter sensor comprises a first electrode spaced apart from a second electrode.

14. The system as in claim 13, wherein the fault state occurs when soot from incomplete burning of hydrocarbon fuel is deposited on the particulate matter sensor such that the soot bridges the gap between the first electrode and the second electrode.

* * * * *